United States Patent
Zeng et al.

(10) Patent No.: US 10,108,376 B1
(45) Date of Patent: Oct. 23, 2018

(54) MEMORY INITIALIZATION

(71) Applicant: Xilinx, Inc., San Jose, CA (US)

(72) Inventors: Michelle E. Zeng, San Jose, CA (US);
Subodh Kumar, San Jose, CA (US);
Uma Durairajan, Sunnyvale, CA (US);
Weiguang Lu, San Jose, CA (US);
Hsiao H. Chen, Los Altos, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/587,294

(22) Filed: May 4, 2017

(51) Int. Cl.
*G11C 16/04* (2006.01)
*G06F 3/06* (2006.01)
*G06F 11/10* (2006.01)

(52) U.S. Cl.
CPC ............ *G06F 3/0659* (2013.01); *G06F 3/064* (2013.01); *G06F 3/0619* (2013.01); *G06F 3/0673* (2013.01); *G06F 11/1008* (2013.01)

(58) Field of Classification Search
CPC ...... G06F 3/0659; G06F 3/0619; G06F 3/064; G06F 3/0673; G11C 11/1008
See application file for complete search history.

(56) References Cited

U.S. PATENT DOCUMENTS

| 5,146,573 | A | * | 9/1992 | Sato | .................... G06F 12/0804 711/206 |
| 6,078,735 | A | | 6/2000 | Baxter | |
| 6,430,103 | B2 | * | 8/2002 | Nakayama | ........... G11C 7/1006 365/189.05 |
| 8,661,198 | B2 | * | 2/2014 | Tsukishiro | .......... G06F 12/0804 711/118 |
| 2013/0073790 | A1 | * | 3/2013 | Nemazie | ............. G06F 12/0207 711/103 |

* cited by examiner

*Primary Examiner* — Pho M Luu
(74) *Attorney, Agent, or Firm* — LeRoy D. Maunu

(57) ABSTRACT

Circuits and methods for initializing a memory. Each row of the memory includes data bits and associated parity bits. A write buffer contains bit values for initializing the memory, and a control circuit performs a first set of write operations that write values from the write buffer to the data bits of the memory without writing values to the associated parity bits. The write buffer performs a second set of write operations that write values from the write buffer to the parity bits associated with the data bits without writing data to the data bits.

20 Claims, 5 Drawing Sheets

MEMORY INITIALIZATION

TECHNICAL FIELD

The disclosure generally relates to initializing memory.

BACKGROUND

RAM is an integral part of many electronic systems. RAM can be a component in a System on a Chip (SOC), a component in a multi-die package, or a component in in a system in which the components populate multiple printed circuit boards. A common application requirement is for the RAM to be initialized when power is initially applied to the system. In some instances, the RAM is initialized to all 0 values, and in other instances the RAM may be initialized with application-specific values.

In some applications the duration of the initialization process can be longer than desired. For example, an SOC may have multiple, individually addressable blocks of RAM. Initialization may involve inputting initialization data to the SOC and on-chip circuitry cycling through RAM addresses and storing the initialization data. Initializing multiple blocks of large RAMs can require a significant amount of data and time.

SUMMARY

An implementation of a circuit for initializing a memory includes a write buffer and a control circuit. The write buffer contains bit values for initializing the memory, and the control circuit performs a first set of write operations that write values from the write buffer to the data bits of the memory without writing values to the associated parity bits. The write buffer performs a second set of write operations that write values from the write buffer to the parity bits of the bytes without writing data to the associated data bits.

A method of initializing a memory includes writing in a first set of write operations, data to the plurality of data bits of the memory without writing values to the associated parity bits. The method also includes writing in a second set of write operations, values to the parity bits of the memory without writing data to the associated data bits.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

Figure 1:
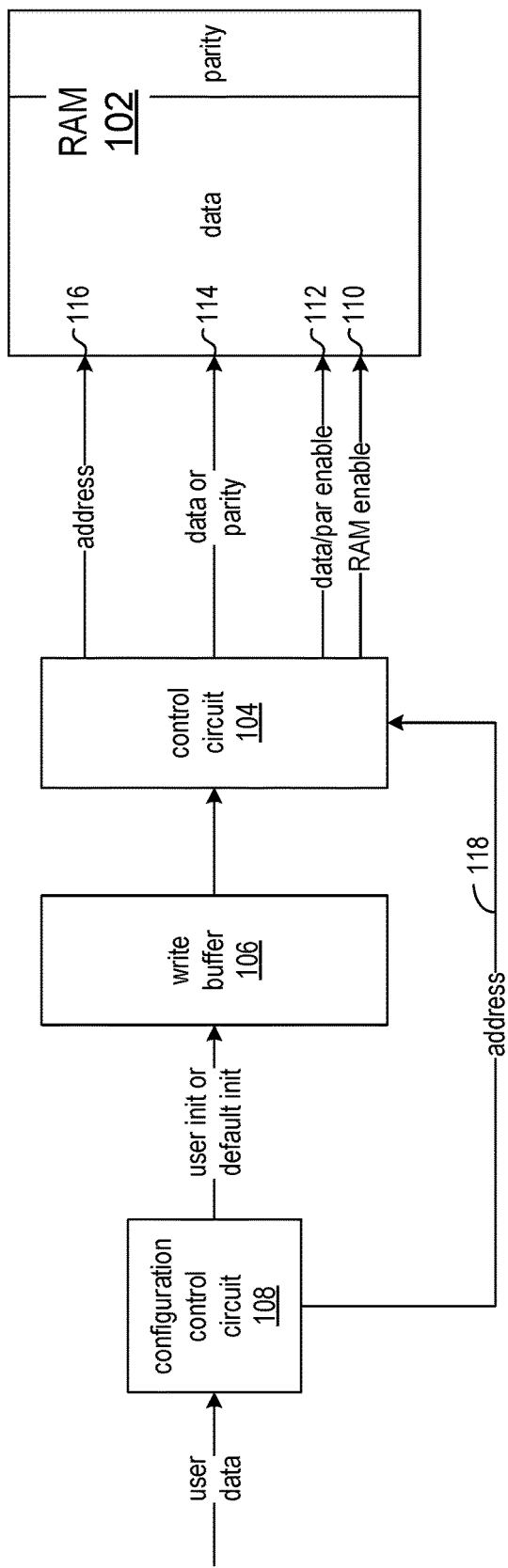
FIG. 1 shows circuitry for initializing a memory.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Prior approaches for initializing memory can be inefficient and slow. In programmable integrated circuits (ICs), such as System On Chips (SoCs) and field programmable gate arrays (FPGAs) from XILINX®, Inc., the memory architecture is designed to fit with the physical interconnect resources of the chip. For example, each programmable IC includes multiple blocks of RAM ("BRAM"), and each BRAM block spans five interconnect blocks. Each interconnect block in turn contains 48 memory cells capable of holding initialization content for the BRAM. Together, the 5 interconnect blocks, having 48 memory cells each, provide a write buffer containing 5×48=240 bits. The write buffer is also called a "frame." A BRAM block has a total of capacity of 36 k bits in a 512×72 block structure. Each write operation is limited to writing 72 bits into the memory.

Continuing with the previous example, by switching an address bit from 0 to 1 between two write operations, one frame can accommodate two full 72-bit write operations for a total of 144 bits. The toggling address bit can be generated by an internal state machine (SM), and concatenated to the configuration address. As one 240-bit frame cannot accommodate 4 writes which would require 4×72=288 bitcells, only 2 writes are performed per frame, which uses 144 out of 240 total available bits per frame. The other bits in the frame are discarded. Since each frame initializes 144 bits, and the total BRAM array consists of 36864 bits, a total of 36864/144=256 frames are needed to fully initialize the array. As only 144 of the 240 memory cells in a frame are used in initializing a BRAM block, additional time must be expended in delivering configuration bits through additional frames to complete initialization of a BRAM block. Also, the total size of the configuration bitstream increases to provide for the unused bits in each frame of bits.

The problems of large configuration bitstreams and slow initialization are exacerbated in newer programmable IC architectures. Though the BRAM block remains a 512×72 memory cell array, the physical size of a BRAM block spans 4 interconnect blocks (instead of 5), and each interconnect block contains 32 memory cells. Thus, each frame is capable of delivering 4×32=128 bits of initialization bits. The reduced number of interconnect blocks means that only one write cycle can be done for each 128-bit frame (2 write cycles would require 72×2=144 bits). Thus, if the prior initialization approach is applied to the programmable IC architecture, only 72 bits can be written per frame, and the remaining 56 bits would be discarded, resulting in a frame usage of 72/128=56%. In addition, to fully initialize a BRAM block, 36,864/72=512 frames would be needed.

In the disclosed circuits and methods, data bits and parity bits of each BRAM block are initialized separately in order to fully utilize each frame of initialization bits. The BRAM block includes multiple bytes, and each byte includes multiple data bits and an associated parity bit. A frame (also referred to as a "write buffer") is filled with initialization values, and along with an address to be initialized, a control signal indicates whether the values in the write buffer are data bits or parity bits. When the write buffer contains values for data bits of the BRAM block, control circuitry coupled between the write buffer and the BRAM block in multiple write operations writes bit values from the write buffer to data bits of the BRAM block without writing the parity bits associated with the bytes. When the write buffer contains values for parity bits of the BRAM block, the control circuitry in multiple write operations writes bit values from the write buffer to parity bits of the BRAM block without writing data bits.

In an exemplary application that illustrates aspects of the disclosed initialization approach, a BRAM block is 72 bits wide and includes 64 data bits and 8 parity bits. A write buffer has storage for 128 bits as described above. Two 64-bit write operations are performed in writing values from the write buffer to data bits of the BRAM block. As the write buffer is 128 bits wide, the two 64-bit write operations fully utilize the available storage in the frame.

In write operations separate from initializing the data bits, 8 8-bit write operations are performed in writing values from the write buffer to parity bits of the BRAM block. Though the write buffer is 128 bits wide, only 64 bit values (8 8-bit write operations) of the write buffer are performed before refilling the write buffer with data or parity bit values instead of performing 16 8-bit write operations to fully utilize the write buffer. The reason for this approach is that in a particular implementation, there is insufficient time to perform 16 write operations to the RAM before the configuration control circuit is able to provide another set of bit values for the write buffer. Also, additional area overhead would be required for a 16-to-1 multiplexer to select 8 bits versus an 8-to-1 multiplexer.

FIG. 1 shows circuitry for initializing a memory. The memory to be initialized is shown as RAM 102. Control circuit 104 controls the writing of values from write buffer 106 to data bits and parity bits of the RAM. The configuration control circuit 108 fills the write buffer with initialization values and provides addresses to the control circuit.

Each row of the exemplary RAM 102 includes data bits and associated parity bits. In an example application, each row includes 8 bytes, and each byte has 8 data bits and an associated parity bit. Thus, each row can have 72 bits. Though separate portions of the RAM 102 are shown for data and parity, the parity bits can be interspersed with the data bits. In addition to the read/write enable port 110, the RAM has an additional enable port 112 for separately enabling writing values on the data port 114 to data bits and parity bits at the address on the address port 116.

The configuration control circuit 108 signals the control circuit 104 whether the values in the write buffer 106 are for initializing data bits of the RAM or for initializing parity bits of the RAM. The signal may be a bit on the address bus 118, for example. In response to the write buffer 106 containing values for data bits, the control circuit enables the signals to the port 112 of the RAM for writing values to the data bits of the RAM and disables the signals to the port 112 for writing parity values to the RAM, which enable data bits at the address at the address port 116 to be written to with the values at the data port 114 and disables writing to parity bits at the address. In response to the write buffer containing values for parity bits, the control circuit enables the signals to the port 112 of the RAM for writing values to the parity bits of the RAM and disables the signals to the port 112 for writing data values to the RAM, which enables writing parity bits at the address at the address port with the values at the data port 114 and disables writing data bits at the address.

In an exemplary implementation, the configuration control circuit 104 does not provide both values for the data bits and values for the parity bits in the write buffer 106 at the same time. In other words, when the control circuit is writing values from the write buffer to the RAM 102, the write buffer contains values for the data bits or values for the parity bits, but not both values for the data bits and values for the parity bits.

When the write buffer 106 contains values for data bits of the RAM 102, the control circuit 104 writes values from a first portion of the write buffer to data bits of the RAM without writing the associated parity bits. The control circuit continues with writing values from a different portion(s) of the write buffer to data bits of the RAM until all the values in the write buffer have been written to the RAM. For example, if each row of the RAM has 64 data bits (8 bytes) and the write buffer stores 128 bit values, the control circuit can perform two write operations to initialize the data bits in two rows of the RAM with values from the write buffer. Each write operation reads 64 bit values from the write buffer and writes the 64 bit values to the subset of bytes of the RAM in the addressed row. Once the values from the write buffer have been written to the RAM, the configuration control circuit 108 can load the write buffer with more values for data bits or values for parity bits of the RAM.

When the write buffer 106 contains values for parity bits of the RAM 102, the control circuit 104 performs multiple write operations, and each write operation writes bit values from a first portion of the write buffer to parity bits of the RAM without writing to the associated data bits. The control circuit continues with writing values from different portions of the write buffer to parity bits of the RAM until all the valid bit values in the write buffer have been written to the RAM. Continuing with the example above in which each row of the RAM has 64 data bits and the write buffer stores 128 bit values, the control circuit can perform multiple write operations to initialize the parity bits in multiple rows of the RAM with values from the write buffer. Each write operation reads 8 bit values from the write buffer and writes the bit values to the parity bits associated with the subset of bytes of the RAM in the addressed row. Once the values from the write buffer have been written to the RAM, the configuration control circuit 108 can load the write buffer with more values for data bits or values for parity bits of the RAM.

Figure 2:
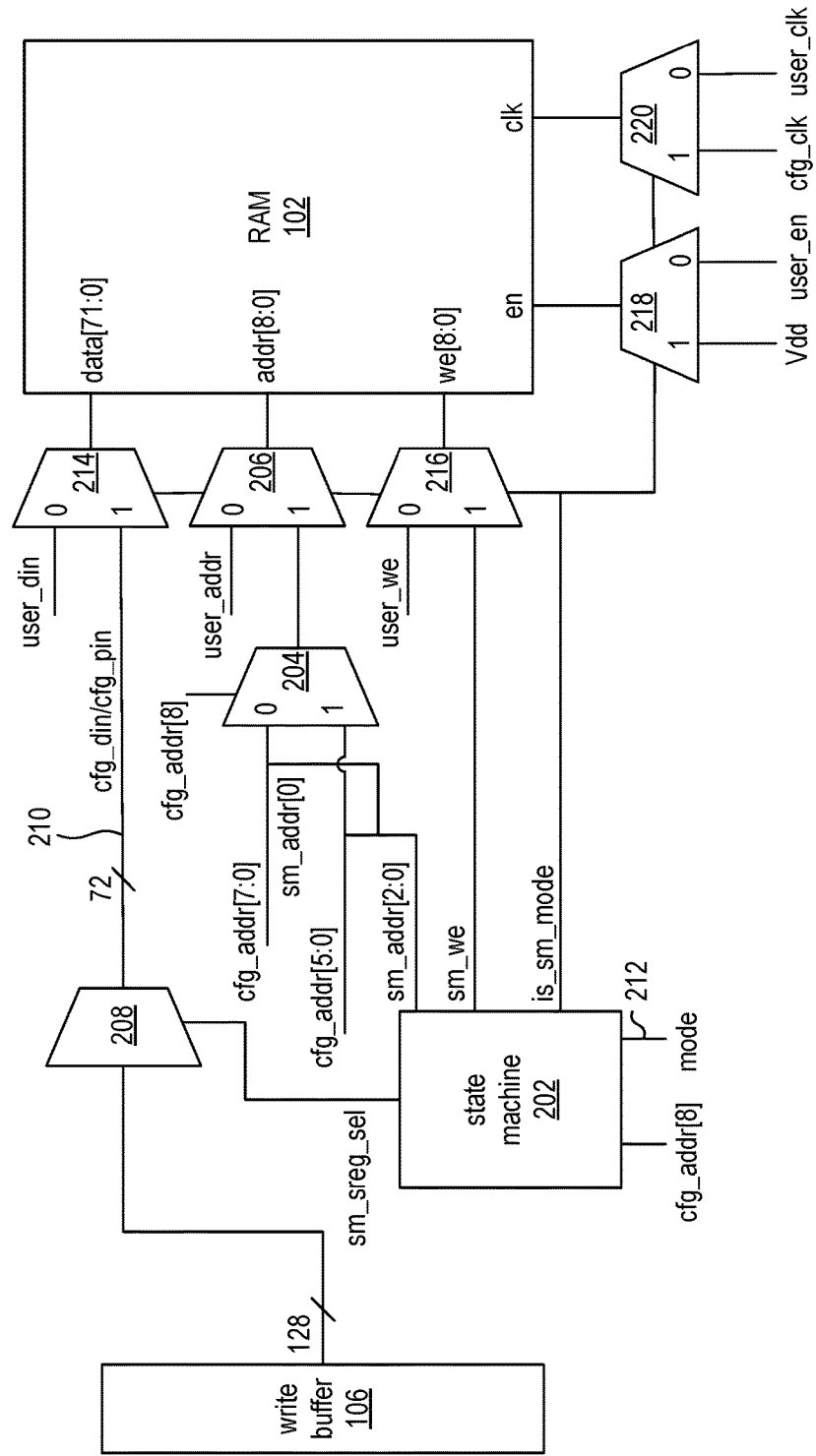
FIG. 2 shows control circuitry for initializing memory by writing data bits separately from the associated parity bits.

FIG. 2 shows control circuitry for initializing memory by writing data bits separately from the associated parity bits. Initialization data bits and parity bits for the RAM 102 are staged in write buffer 106 as described above. Control circuitry couples the write buffer to the RAM and controls the writing of values from the write buffer to either data bits or parity bits of the RAM. For ease of explanation, the exemplary RAM has 512 rows of 72 bits, and the write buffer has 128 bits. Though specific values are shown, those skilled in the art will recognize that the disclosed circuitry can be readily adapted to RAMs and write buffers of different sizes.

The control circuitry generally generates addresses to the RAM based on an input address from the configuration control circuit (FIG. 1) and address bits generated by the state machine 202, selects bit values from portions of the write buffer for writing to the RAM, controls the write enable signals for separately writing to the data bits and to the parity bits of the RAM, and controls operating the RAM in an initialization mode versus a user run-time mode. User run-time mode refers to use of the RAM by application circuitry implemented on the programmable IC after initialization.

The addresses provided by the configuration control circuit and address bits generated by the state machine 202 are used to generate addresses to the RAM. The address provided by the configuration control circuit is identified as cfg_addr, and the MSB in cfg_addr indicates whether the write buffer 106 contains data bits or parity bits. When the write buffer contains data bits, multiplexer 204 selects the address bits at input "0." The address bits at input "0" include cfg_addr[7:0] as the most significant bits and sm_addr[0] from the state machine as the least significant bit. As the write buffer contains data bits sufficient for writing to two rows of the RAM, the state machine switches the value of sm_addr[0] for the same value of cfg_addr[7:0] in performing a set of two write operations using data from the write buffer.

When the write buffer 106 contains parity bits, multiplexer 204 selects the address bits at input "1." The address bits at input "1" include cfg_addr[5:0] as the most significant bits and sm_addr[2:0] from the state machine as the least significant bits. As the write buffer contains parity bits sufficient for writing to 8 rows of the RAM, the state machine generates 8 different values on sm_addr[2:0] for the same value of cfg_addr[5:0] in performing a set of eight write operations using data from the write buffer. In response to the state of the is_sm_mode signal, multiplexer 206 selects the address at input "1" for initializing the RAM, or selects the address at input "0" for providing runtime access to application circuitry.

The control circuitry uses multiplexer circuitry 208 to select bit values from portions of the write buffer 106 for writing to the RAM. Based on the state of the cfg_addr[8] signal that indicates whether the write buffer contains data bits or parity bits and which write operation of the set of write operations using bit values from the write buffer is being performed, the state machine 202 controls the sm_reg_sel signals to control which bit values are selected from the write buffer. The multiplexer circuitry formats the selected bit values for output on the 72-bit bus 210.

When the cfg_addr[8] signal indicates that the write buffer 106 contains data bits, the state machine 202 initiates back-to-back write operations. The signal sm_sreg_sel selects between the two sets of 64-bit bit values from the 128-bit write buffer. At the end of the two write operations, both the sm_addr and sm_sreg_sel return to default LOW state.

When the cfg_addr[8] signal indicates that the write buffer 106 contains parity bits, the state machine 202 initiates eight back-to-back write operations. Between each write operation, the SM increments the 3-bit address bus sm_addr[2:0], from 3b'000 to 3b'111. The 3 bits of sm_addr[2:0] are concatenated with cfg_addr[5:0], before being driven to the RAM. Similarly, the signals on the 3-bit mux-select bus sm_sreg_sel[2:0] are generated internally by the state machine to increment from 3b'000 to 3b'111 and select a different subset of 8 bits from the 128-bit write buffer to write into the RAM in each of the eight write operations. At the end of eight write operations, the state machine returns both the sm_addr[2:0] and sm_sreg_sel[2:0] to the default state of 3b'000, and a total of 8×8=64 bits of parity will have been written into the RAM.

The state machine 202 controls the byte write enable signals for separately writing to the data bits and to the parity bits of the RAM. At the byte write-enable port we[8:0], the 8 LSBs (we[7:0]) each control writing to 8 data bits in an addressed row of the RAM 102. The MSB (we[8]) controls the 8 parity bits associated with the data bits in the addressed row. By controlling the values of we[7:0] and we[8], the RAM can write either data or parity bits into the array, while blocking writing values to the other type.

In response to the cfg_addr[8] signal indicating that the write buffer 106 contains values for data bits of the RAM 102, the state machine 202 sets we[7:0] to HIGH to enable writing to data bits in an addressed row, and sets we[8] to LOW to disable writing to the parity bits in the addressed row. In response to the cfg_addr[8] signal indicating that the write buffer contains values for parity bits of the RAM, the state machine sets we[7:0] to LOW to disable writing to the data bits in the addressed row, and sets we[8] to HIGH to enable writing to parity bits in the addressed row.

As the bus 210 carries 72 bits, when carrying data bits to write to the RAM, 64 of the 72 bits carry valid values for the data bits. When carrying parity bits to write to the RAM, 8 of the 72 bits carry valid values for the parity bits. In a physical implementation, the parity bits can be interspersed in the 72 bit bus. However, for ease of description, the 64 data bits as are designated as cfg_din[63:0], and the parity bits are designated as cfg_pin[7:0] in the figures that follow.

The state machine 202 further controls operating the RAM 102 in either initialization mode or run-time mode. The state machine responds to the mode signal 212 from the configuration control circuit 108 (FIG. 1). During configuration of the programmable IC when the RAM is undergoing initialization, the state machine adjusts the state of the is_sm_mode signal to control the selections by multiplexers 206, 214, 216, 218, and 220. During configuration, the is_sm_mode signal selects input "1" at multiplexer 214, selects input "1" at multiplexer 206, selects input "1" at multiplexer 216, selects input "1" at multiplexer 218, and selects input "1" at multiplexer 220. The inputs "0" are selected at the multiplexers 206, 214, 216, 218, and 220 in response to the is_sm_mode indicating run-time mode.

Table 1 below shows an exemplary initialization sequence for the RAM 102 and states of signals in the circuitry of FIG. 2.

TABLE 1

| frame | frame cycle | cfg_addr [8:0] | Type | we[7:0] | we[8] | sm_addr | sm_sreg_sel | SRAM addr (cfg_addr + sm_addr) | Number bits written | Cumulative bits written |
|---|---|---|---|---|---|---|---|---|---|---|
| 0 | 1 | 000000000 | DATA | FF | 0 | 0 | 0 | 000000000 | 64 | 64 |
| 0 | 2 | 000000000 | DATA | FF | 0 | 1 | 1 | 000000001 | 64 | 128 |
| 1 | 1 | 000000001 | DATA | FF | 0 | 0 | 0 | 000000010 | 64 | 192 |
| 1 | 2 | 000000001 | DATA | FF | 0 | 1 | 1 | 000000011 | 64 | 256 |
| 2 | 1 | 000000010 | DATA | FF | 0 | 0 | 0 | 000000100 | 64 | 320 |
| 2 | 2 | 000000010 | DATA | FF | 0 | 1 | 1 | 000000101 | 64 | 384 |
| 3 | 1 | 000000011 | DATA | FF | 0 | 0 | 0 | 000000110 | 64 | 448 |
| 3 | 2 | 000000011 | DATA | FF | 0 | 1 | 1 | 000000111 | 64 | 512 |
| ... | ... | ... | DATA | FF | 0 | ... | ... | ... | .. | ... |

TABLE 1-continued

| frame | frame cycle | cfg_addr [8:0] | Type | we[7:0] | we[8] | sm_ addr | sm_ sreg_ sel | SRAM addr (cfg_addr + sm_addr) | Number bits written | Cumulative bits written |
|---|---|---|---|---|---|---|---|---|---|---|
| 254 | 1 | 011111110 | DATA | FF | 0 | 0 | 0 | 111111100 | 64 | 32576 |
| 254 | 2 | 011111110 | DATA | FF | 0 | 1 | 1 | 111111101 | 64 | 32640 |
| 255 | 1 | 011111111 | DATA | FF | 0 | 0 | 0 | 111111110 | 64 | 32704 |
| 255 | 2 | 011111111 | DATA | FF | 0 | 1 | 1 | 111111111 | 64 | 32768 |
| END OF DATA BITS INITIALIZATION. BEGINNING PARITY BITS INITIALIZATION | | | | | | | | | | |
| 256 | 1 | 100000000 | PAR | 0 | 1 | 000 | 000 | 000000000 | 8 | 32776 |
| 256 | 2 | 100000000 | PAR | 0 | 1 | 001 | 001 | 000000001 | 8 | 32784 |
| 256 | 3 | 100000000 | PAR | 0 | 1 | 010 | 010 | 000000010 | 8 | 32792 |
| 256 | 4 | 100000000 | PAR | 0 | 1 | 011 | 011 | 000000011 | 8 | 32800 |
| 256 | 5 | 100000000 | PAR | 0 | 1 | 100 | 100 | 000000100 | 8 | 32808 |
| 256 | 6 | 100000000 | PAR | 0 | 1 | 101 | 101 | 000000101 | 8 | 32816 |
| 256 | 7 | 100000000 | PAR | 0 | 1 | 110 | 110 | 000000110 | 8 | 32824 |
| 256 | 8 | 100000000 | PAR | 0 | 1 | 111 | 111 | 000000111 | 8 | 32832 |
| 257 | 1 | 100000001 | PAR | 0 | 1 | 000 | 000 | 000001000 | 8 | 32840 |
| 257 | 2 | 100000001 | PAR | 0 | 1 | 001 | 001 | 000001001 | 8 | 32848 |
| 257 | 3 | 100000001 | PAR | 0 | 1 | 010 | 010 | 000001010 | 8 | 32856 |
| 257 | 4 | 100000001 | PAR | 0 | 1 | 011 | 011 | 000001011 | 8 | 32864 |
| 257 | 5 | 100000001 | PAR | 0 | 1 | 100 | 100 | 000001100 | 8 | 32872 |
| 257 | 6 | 100000001 | PAR | 0 | 1 | 101 | 101 | 000001101 | 8 | 32880 |
| 257 | 7 | 100000001 | PAR | 0 | 1 | 110 | 110 | 000001110 | 8 | 32888 |
| 257 | 8 | 100000001 | PAR | 0 | 1 | 111 | 111 | 000001111 | 8 | 32896 |
| ... | ... | ... | PAR | 0 | 1 | ... | ... | ... | 8 | ... |
| 319 | 1 | 100111111 | PAR | 0 | 1 | 000 | 000 | 111111000 | 8 | 36808 |
| 319 | 2 | 100111111 | PAR | 0 | 1 | 001 | 001 | 111111001 | 8 | 36816 |
| 319 | 3 | 100111111 | PAR | 0 | 1 | 010 | 010 | 111111010 | 8 | 36824 |
| 319 | 4 | 100111111 | PAR | 0 | 1 | 011 | 011 | 111111011 | 8 | 36832 |
| 319 | 5 | 100111111 | PAR | 0 | 1 | 100 | 100 | 111111100 | 8 | 36840 |
| 319 | 6 | 100111111 | PAR | 0 | 1 | 101 | 101 | 111111101 | 8 | 36848 |
| 319 | 7 | 100111111 | PAR | 0 | 1 | 110 | 110 | 111111110 | 8 | 36856 |
| 319 | 8 | 100111111 | PAR | 0 | 1 | 111 | 111 | 111111111 | 8 | 36864 |

Figure 3:
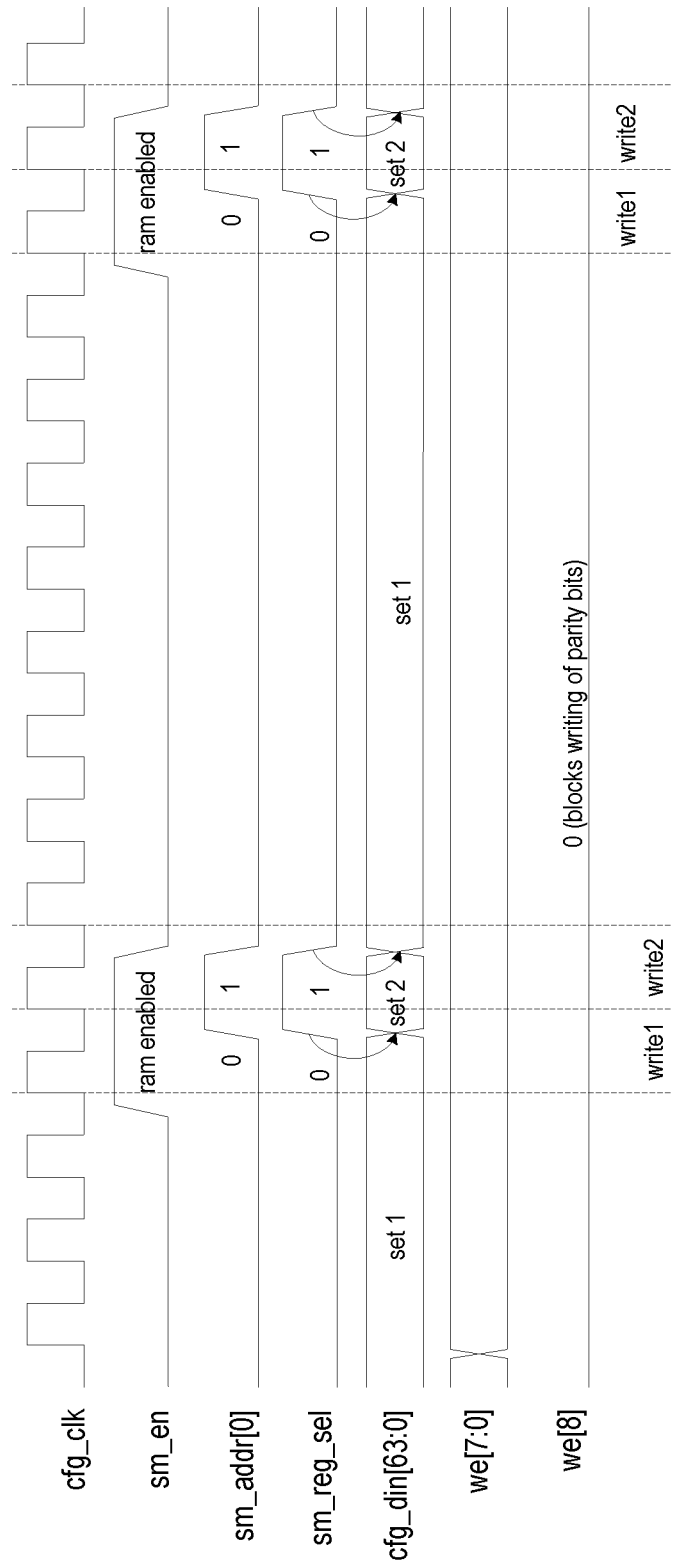
FIG. 3 shows a timing diagram associated with the circuitry of FIG. 2 for initializing data bits of the RAM with bit values from the write buffer.

FIG. 3 shows a timing diagram associated with the circuitry of FIG. 2 for initializing data bits of the RAM 102 with bit values from the write buffer 106. The sm_en signal enables the RAM for writing. The state machine 202 generates the sm_addr[0] signal at logic level 0 when writing the first set of values ("set 1") from the write buffer to the RAM and the sm_addr[0] signal at logic level 1 when writing the second set of values ("set 2") from the write buffer. The state machine similarly generates the sm_reg_sel signal at logic level 0 and logic level 1 for selecting bit values from two portions of the write buffer. While writing bit values from the write buffer to data bits of the RAM, the state machine generates we[7:0] signals at logic level 1 to enable writing to the data bits and generates we[8] at logic level 0 to disable writing to the parity bits. The state machine restores the sm_addr[0] and sm_reg_sel signals to logic level 0 while the write buffer is reloaded with another set of bit values. Another set of write operations can commence once the write buffer is filled.

Figure 4:
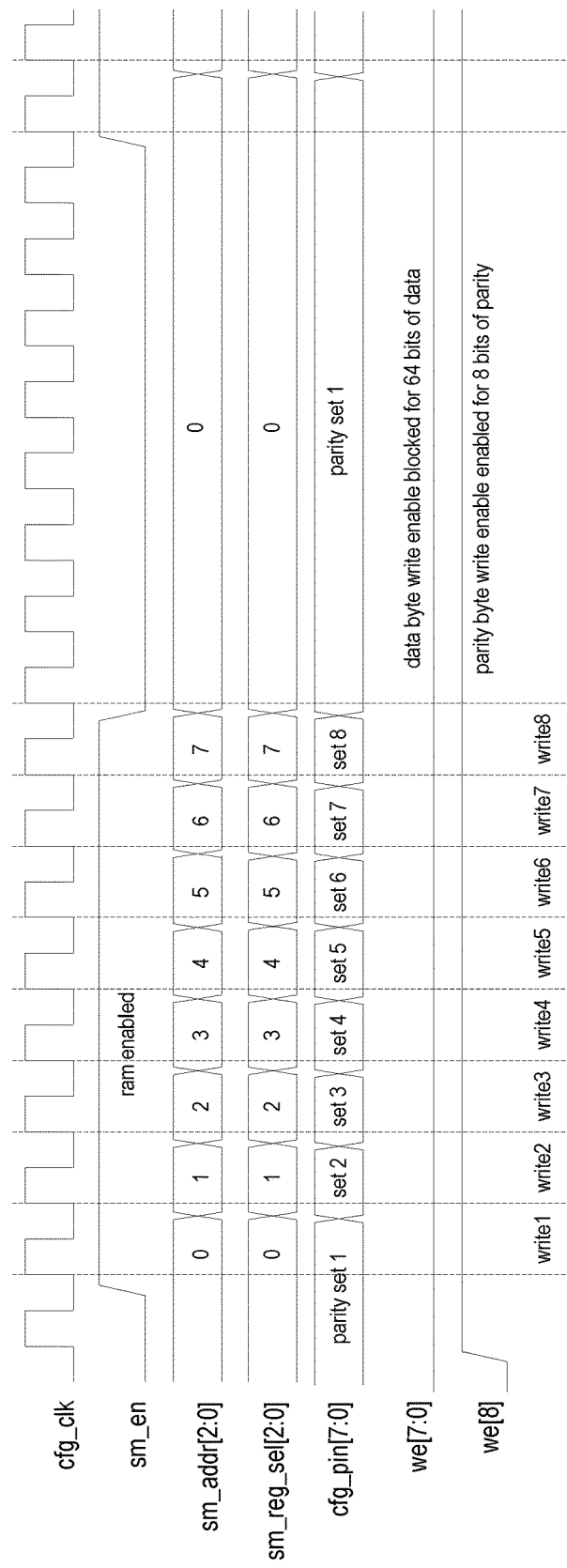
FIG. 4 shows a timing diagram associated with the circuitry of FIG. 2 for initializing parity bits of the RAM with bit values from the write buffer.

FIG. 4 shows a timing diagram associated with the circuitry of FIG. 2 for initializing parity bits of the RAM 102 with bit values from the write buffer 106. The sm_en signal enables the RAM for writing. The state machine 202 generates the sm_addr[2:0] signals at bit values 3b'000 to 3b'111 for writing 8 sets of values ("set 1" . . . "set 8") from the write buffer to the RAM. The state machine similarly generates the sm_reg_sel signal at at bit values 3b'000 to 3b'111 for selecting bit values from 8 portions of the write buffer. While writing bit values from the write buffer to parity bits of the RAM, the state machine generates we[7:0] signals at logic level 0 to disable writing to the data bits and generates we[8] at logic level 1 to enable writing to the parity bits. The state machine resets the sm_addr[0] and sm_reg_sel signals to 3b'000 while the write buffer is loaded with another set of bit values. Another set of write operations can commence once the write buffer is filled.

Figure 5:
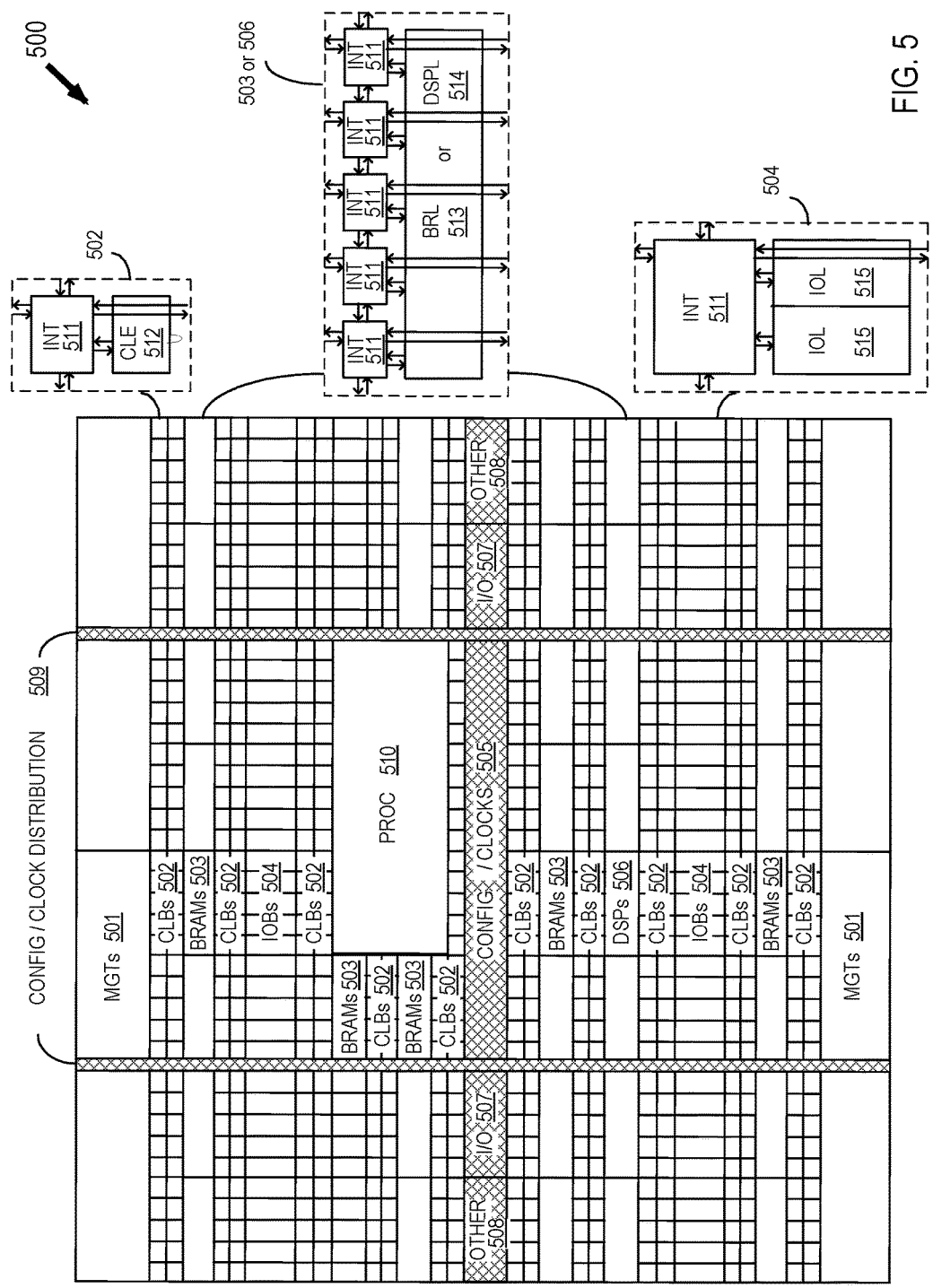
FIG. 5 shows a programmable integrated circuit (IC) on which the disclosed circuits and processes may be implemented.

FIG. 5 shows a programmable integrated circuit (IC) 500 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 5 illustrates programmable IC 500 that includes a large number of different programmable tiles including multi-gigabit transceivers (MGTs) 501, configurable logic blocks (CLBs) 502, random access memory blocks (BRAMs) 503, input/output blocks (IOBs) 504, configuration and clocking logic (CONFIG/CLOCKS) 505, digital signal processing blocks (DSPs) 506, specialized input/output blocks (I/O) 507, for example, clock ports, and other programmable logic 508 such as digital clock managers, analog-to-digital converters, system monitoring logic, and so forth. Some programmable IC having FPGA logic also include dedicated processor blocks (PROC) 510 and internal and external reconfiguration ports (not shown).

In some FPGA logic, each programmable tile includes a programmable interconnect element (INT) 511 having standardized connections to and from a corresponding interconnect element in each adjacent tile. Therefore, the programmable interconnect elements taken together implement the programmable interconnect structure for the illustrated FPGA logic. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic, plus a single programmable interconnect element INT 511. A BRAM 503 can include a BRAM logic element (BRL) 513 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 506 can include a DSP logic element (DSPL) 514 in addition to an appropriate number of programmable interconnect elements. An IOB 504 can include, for example, two instances of an input/output logic element (IOL) 515 in addition to one instance of the programmable interconnect element INT 511. As will be clear to those of skill in the art, the actual I/O bond pads connected, for example, to the I/O logic element 515, are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 5 include additional logic blocks that disrupt the regular columnar structure making up a large part of the programmable IC. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual programmable IC, more than one adjacent column of CLBs is typically included wherever the CLBs appear, to facilitate the efficient implementation of user logic.

In further aspects of the disclosed circuits and methods, a context-aware approach is taken for initialization of groups of BRAM blocks. In prior approaches, all BRAM blocks on the chip are always initialized. For BRAM blocks that require application-specific initialization, an application configuration bitstream is used, and the configuration bitstream is padded with 0's for any remaining BRAM blocks. This approach provides that after initialization, all BRAM blocks contain either application-specific data or 0s. Because the prior initialization approach is not context aware, even if only a small number of BRAM blocks are used by the application circuitry, the bitstream size is always the full size and contains padded data for every BRAM block on chip. In addition, the time required to complete the configuration is directly proportional to the number of BRAM blocks on-chip. In a particular exemplary programmable IC architecture, a granularity of 12 BRAM blocks are initialized at one time before moving on to the next group of 12 BRAM blocks. Having a high number of blocks needing to be serially initialized significantly increases configuration time.

To reduce the time required for initialization, circuit design tools are configured to generate a configuration bitstream that initializes only BRAM blocks that are used by the implemented circuit design. In a particular implementation directed to a programmable IC in which BRAM blocks are initialized as a group, the circuit design tool generates initialization data for the BRAM blocks in a group only if one or more of the BRAM blocks in the group are accessed by the circuit design. Application-specific initialization data is generated according to the circuit design specification for one or more of the BRAM blocks in the group, and the circuit design tool generates 0-padded configuration data for other BRAM blocks in the group. The circuit design tool does not generate any configuration data for BRAM blocks of the programmable IC that are unused by the circuit design. Generating configuration data for only BRAM blocks that are accessed by the circuit design can significantly reduce the size of the configuration bitstream size, because the size of the bitstream will be proportional to usage. In a best-case scenario where the only BRAM blocks accessed by the circuit design are in the same group, the size of the configuration bitstream size will be a small fraction of the old scheme. In many applications the majority of the BRAM blocks on a programmable IC are not used and with the disclosed approach left uninitialized, thereby saving both data storage size and configuration time. As the configuration bitstream contains configuration data for a subset of the BRAM blocks on the programmable IC, the control circuit (FIG. 1, #104) writes values to the data bits and parity bits of the subset of BRAM blocks addressed in the configuration bitstream and bypasses writing values to the data bits and parity bits of the subset of BRAM blocks not addressed in the configuration bitstream.

Another aspect of the disclosed initialization approaches optimizes the order in which different types of memory blocks are initialized. In prior approaches, configuration was performed in the following order. First, the configuration control circuit cleared all configuration memory cells including TYPE0 (user settings), TYPE1 (BRAM contents), and TYPE3 (EFUSE). Clearing the memory cells in TYPE1 memory is the most time-consuming due to the need to cycle through each memory address in order to write a 0 value. After the initial clearing of configuration memory cells, the EFUSE cells were configured for purposes of repairing TYPE1 memory. Since the clearing of TYPE1 memory occurred before the EFUSE configuration, working columns may replace defective columns, bringing into the TYPE1 memory, cells that were not previously configured. Next, the memory BIST initialized the TYPE1 memory to 0 values. Then, the user bitstream was loaded to configure application-specific settings and data. Finally, the TYPE1 memory was again initialized with 0 values or application-specific initialization values.

The prior initialization approach was inefficient for several reasons. Because a first initialization of TYPE1 memory was performed before EFUSE loading, another TYPE1 initialization was required as the EFUSE loading may have physically altered the connection of useable memory cells. In addition, whether or not TYPE1 memory has a user-specific bitstream, each BRAM block undergoes the lengthy sequence three times. This is unnecessary for BRAMs without user bitstream provided, because such BRAMs are cleared to 0 values at the end of the memory BIST.

The disclosed approach reduces the number of RAMs needing initialization and optimizes the individual RAM initialization process to eliminate redundant steps. To address the inefficiencies, the initialization steps are reordered. First, the initialization process clears only TYPE0 and TYPE3/4 memory before EFUSE loading. TYPE1 and TYPE2 memories are not initialized prior to EFUSE loading. After clearing the TYPE 0 and TYPE 3/4 memories, EFUSEs are loaded, which can result in spare memory cells replacing defective memory cells in the memories. After EFUSE loading, the TYPE1 and TYPE2 memories are cleared. If there is no user-provided data, the initialization is complete as soon as TYPE0 user memory cells are loaded. If there is a user-supplied memory content, the state machine then cycles through and writes the user data into the memory cells. In this approach, there is no need for repeated memory cell writes. The RAM block is cycled through and written to only once if no user bitstream present, and twice—first to all 0's, then to user data—if a user bitstream is provided. Compared to the previous scheme, configuration time is greatly reduced.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for protecting against attacks from remote network devices. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit for initializing a memory, comprising:
   a write buffer;
   a control circuit coupled to the write buffer and to the memory, wherein the control circuit is configured to:
      perform a first set of write operations that write values from the write buffer to a plurality of data bits of the memory without writing values to parity bits associated with the plurality of data bits; and
      perform a second set of write operations that write values from the write buffer to the parity bits associated with the plurality of data bits without writing data to the plurality of data bits.

2. The circuit of claim 1, wherein in the first set of write operations, the write buffer contains only values for the plurality of data bits.

3. The circuit of claim 1, wherein the control circuit, in performing the first set of write operations, is configured to select all values present in the write buffer for the plurality of data bits.

4. The circuit of claim 1, wherein in the second set of write operations, the write buffer contains values for parity bits associated with the plurality of data bits and no values for the plurality of data bits.

5. The circuit of claim 1, wherein the control circuit, in performing the second set of write operations, is configured to select values present in the write buffer only for the parity bits associated with the plurality of data bits.

6. The circuit of claim 1, wherein the control circuit is further configured to:
   write values from a first portion of the write buffer to data bits in a row of the memory in a first write operation of the first set of write operations; and
   write values from another portion of the write buffer to data bits in another row of the memory in a second write operation of the first set of write operations.

7. The circuit of claim 1, wherein the control circuit is further configured to:
   write values from a first portion of the write buffer to parity bits in a row of the memory in a first write operation of the second set of write operations; and
   write values from another portion of the write buffer to parity bits in another row of the memory in a second write operation of the second set of write operations.

8. The circuit of claim 1, wherein the control circuit is further configured, for each write operation of the first set of write operations, to:
   input to the memory an address that addresses a row of the memory;
   input to the memory, respective write enable signals having states that enable writing values to data bits of the row of the memory; and
   input another write enable signal for the parity bits associated with the data bits in the row of the memory, the other write enable signal having a state that disables writing values to the parity bits of the row of the memory.

9. The circuit of claim 1, wherein the control circuit is further configured, for each write operation of the second set of write operations, to:
   input to the memory an address that addresses a row of the memory;
   input to the memory the respective write enable signals having states that disable writing values to data bits of the row of the memory; and
   input another write enable signal for the parity bits in the row of the memory, the other write enable signal having a state that enables writing values to the parity bits of the row of the memory.

10. The circuit of claim 1, wherein:
    the memory includes a plurality of individually addressable memory blocks;
    the control circuit is further configured, in performing the first set of write operations, to:
       write values to the plurality of data bits of a first subset of the plurality of memory blocks; and
       bypass writing values to the plurality of data bits of a second subset of the plurality of memory blocks; and
    the control circuit is further configured, in performing the second set of write operations, to:
       write values to the parity bits of the first subset of the plurality of memory blocks; and
       bypass writing values to the parity bits of the second subset of the plurality of memory blocks.

11. A method of initializing a memory, comprising:
    writing in a first set of write operations, values from a write buffer to a plurality of data bits of the memory without writing values to parity bits associated with the plurality of data bits; and
    writing in a second set of write operations, values from the write buffer to the parity bits associated with the plurality of data bits without writing values to the plurality of data bits.

12. The method of claim 11, wherein in the first set of write operations, the write buffer contains only values for the plurality of data bits.

13. The method of claim 11, wherein the writing in the first set of write operations includes selecting all values present in the write buffer for the plurality of data bits.

14. The method of claim 11, wherein in the second set of write operations, the write buffer contains only values for the parity bits associated with the plurality of data bits.

15. The method of claim 11, wherein the writing in the second set of write operations includes selecting values present in the write buffer only for the parity bits associated with the plurality of data bits.

16. The method of claim 11, wherein the writing in the first set of write operations includes:
- writing values from a first portion of the write buffer to data bits in a row of the memory in a first write operation of the first set of write operations; and
- writing values from another portion of the write buffer to data bits in another row of the memory in a second write operation of the first set of write operations.

17. The method of claim 11, wherein the writing in the second set of write operations includes:
- writing values from a first portion of the write buffer to parity bits in a row of the memory in a first write operation of the second set of write operations; and
- writing values from another portion of the write buffer to parity bits in another row of the memory in a second write operation of the second set of write operations.

18. The method of claim 11, further comprising for each write operation of the first set of write operations:
- inputting to the memory, an address that addresses a row of the memory;
- inputting to the memory, respective write enable signals having states that enable writing values to data bits of the row of the memory; and
- inputting another write enable signal for the parity bits associated with the data bits in the row of the memory, the other write enable signal having a state that disables writing values to the parity bits of the row of the memory.

19. The method of claim 11, further comprising for each write operation of the second set of write operations:
- inputting to the memory an address that addresses a row of the memory;
- inputting to the memory the respective write enable signals for having states that disable writing values to data bits of the row of the memory; and
- inputting another write enable signal for the parity bits in the row of the memory, the other write enable signal having a state that enables writing values to the parity bits of the row of the memory.

20. The method of claim 11, wherein the memory includes a plurality of spare memory cells, and the method further comprises configuring, before the writing in the first set of write operations and before the writing in the second set of write operations, one or more e-fuses that switch-in ones of the spare memory cells for faulty memory cells of the plurality of bytes.

* * * * *